United States Patent [19]

Gale et al.

[11] Patent Number: 4,808,117

[45] Date of Patent: Feb. 28, 1989

[54] COUPLER WITH COMBINATION LOCKING AND BONDING RING

[75] Inventors: Edwin J. Gale, Aurora; Albert B. Olsen, Littleton, both of Colo.

[73] Assignee: Stanley Aviation Corporation, Aurora, Colo.

[21] Appl. No.: 94,400

[22] Filed: Sep. 8, 1987

[51] Int. Cl.⁴ .............................. H01R 4/64
[52] U.S. Cl. ..................... 439/192; 439/321
[58] Field of Search ............ 439/191, 192, 318, 321; 174/47, 78, 945; 285/82; 361/215

[56] References Cited

U.S. PATENT DOCUMENTS

| | | | |
|---|---|---|---|
| 2,890,434 | 6/1959 | Ray et al. | 439/321 |
| 3,669,472 | 6/1972 | Nadsady | 339/89 R |
| 3,753,205 | 8/1973 | Tuger | 439/192 |
| 3,891,290 | 6/1975 | Marshall | 439/192 |
| 3,891,291 | 6/1975 | Nadsady et al. | 339/15 |
| 3,999,825 | 12/1976 | Cannon | 339/15 |
| 4,008,937 | 2/1977 | Filippi | 339/15 |
| 4,285,564 | 8/1981 | Spinner | 439/321 |
| 4,346,428 | 8/1982 | Gale | 339/15 |
| 4,487,426 | 12/1984 | Gale et al. | 339/14 R |

FOREIGN PATENT DOCUMENTS 692067 10/1930 France .
1046601 10/1966 United Kingdom .

*Primary Examiner*—John McQuade
*Attorney, Agent, or Firm*—Fields, Lewis, Pittenger & Rost

[57] ABSTRACT

A bonding jumper is mounted on one facing surface of first and second coupling means which are threadably interconnected. The bonding jumper has a plurality of resilient detent members for bearing against the facing surface of the other coupling means to establish a redundant electrical bond between the first and second coupling means when the facing surfaces are axially drawn toward each other. A plurality of recesses is provided in the second surface for coacting with the detent means to yieldably resist opposing relative rotation in the unthreading direction.

10 Claims, 6 Drawing Sheets

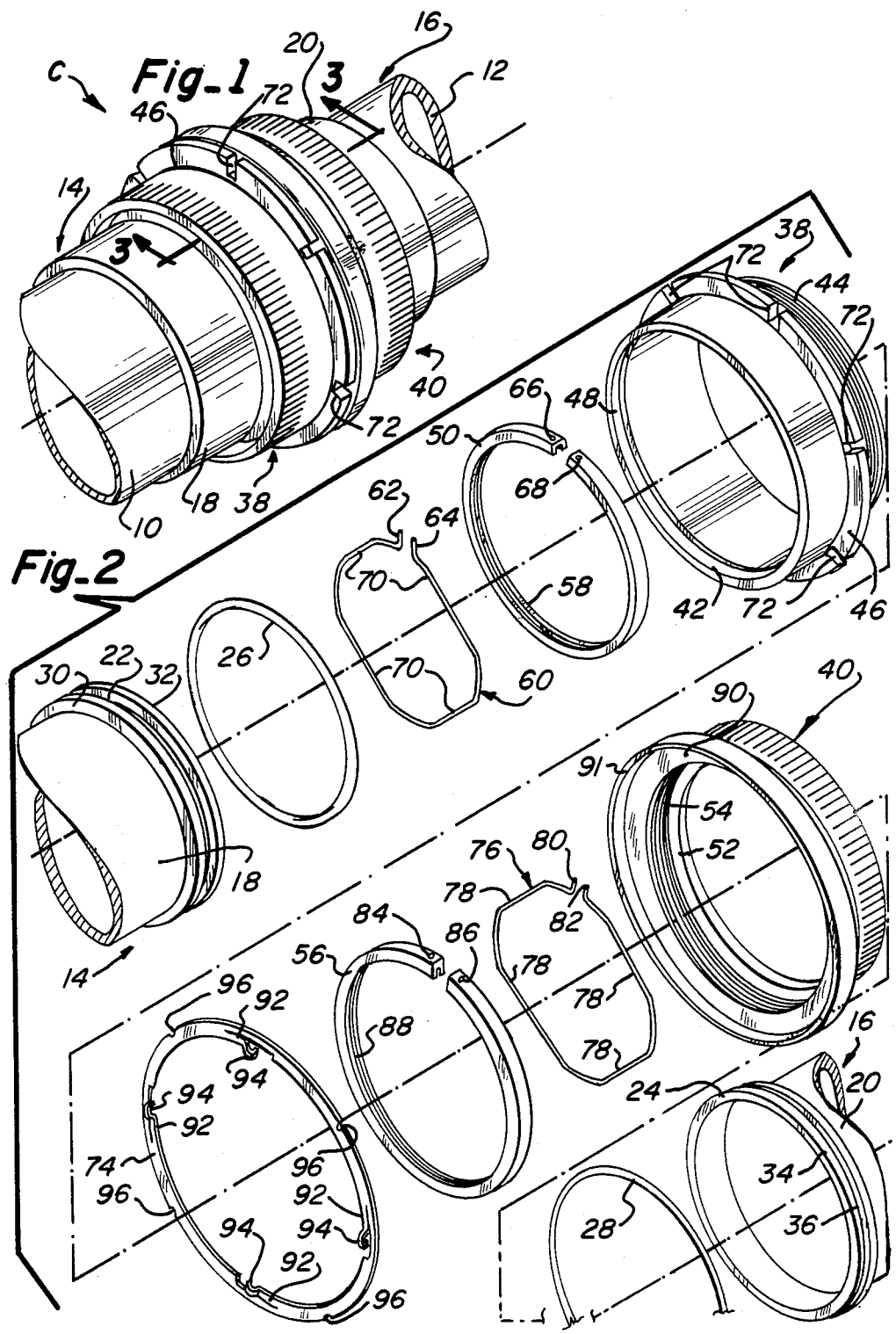

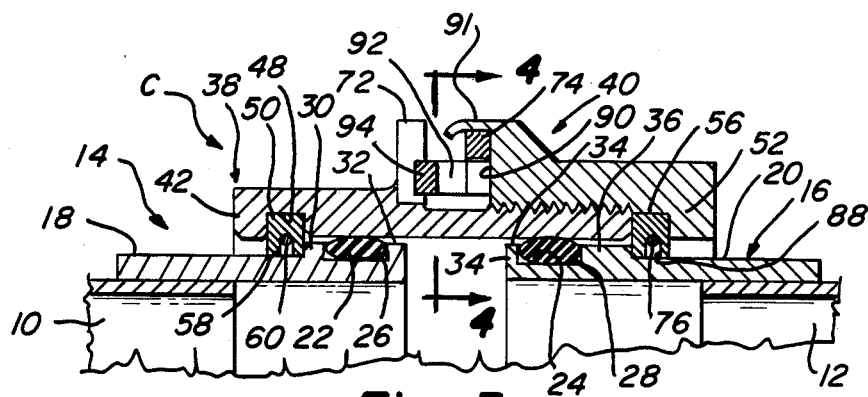
Fig_3
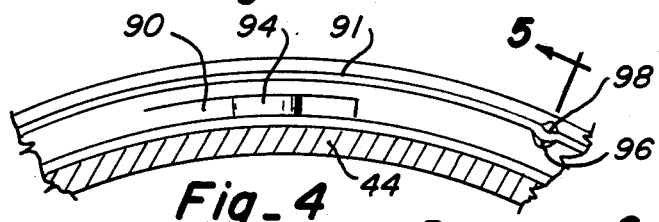
Fig_4
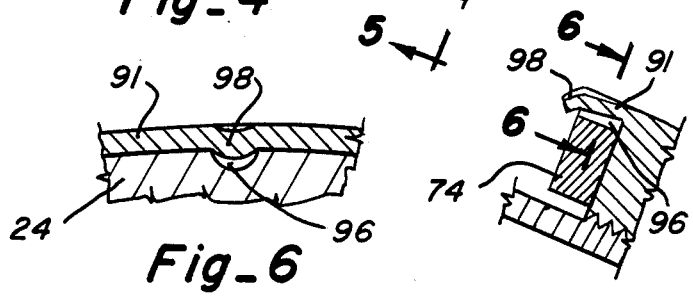
Fig_6   Fig_5
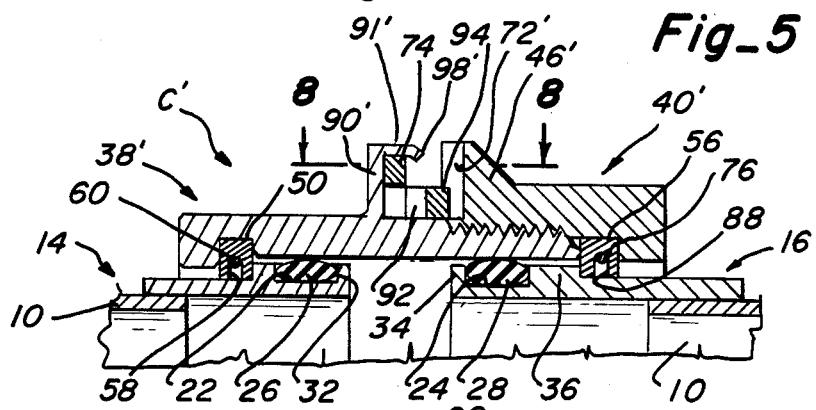
Fig_7
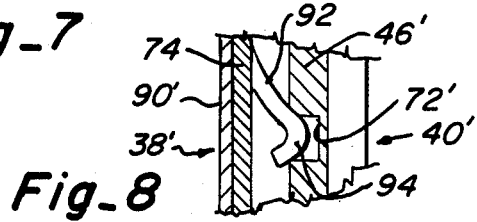
Fig_8

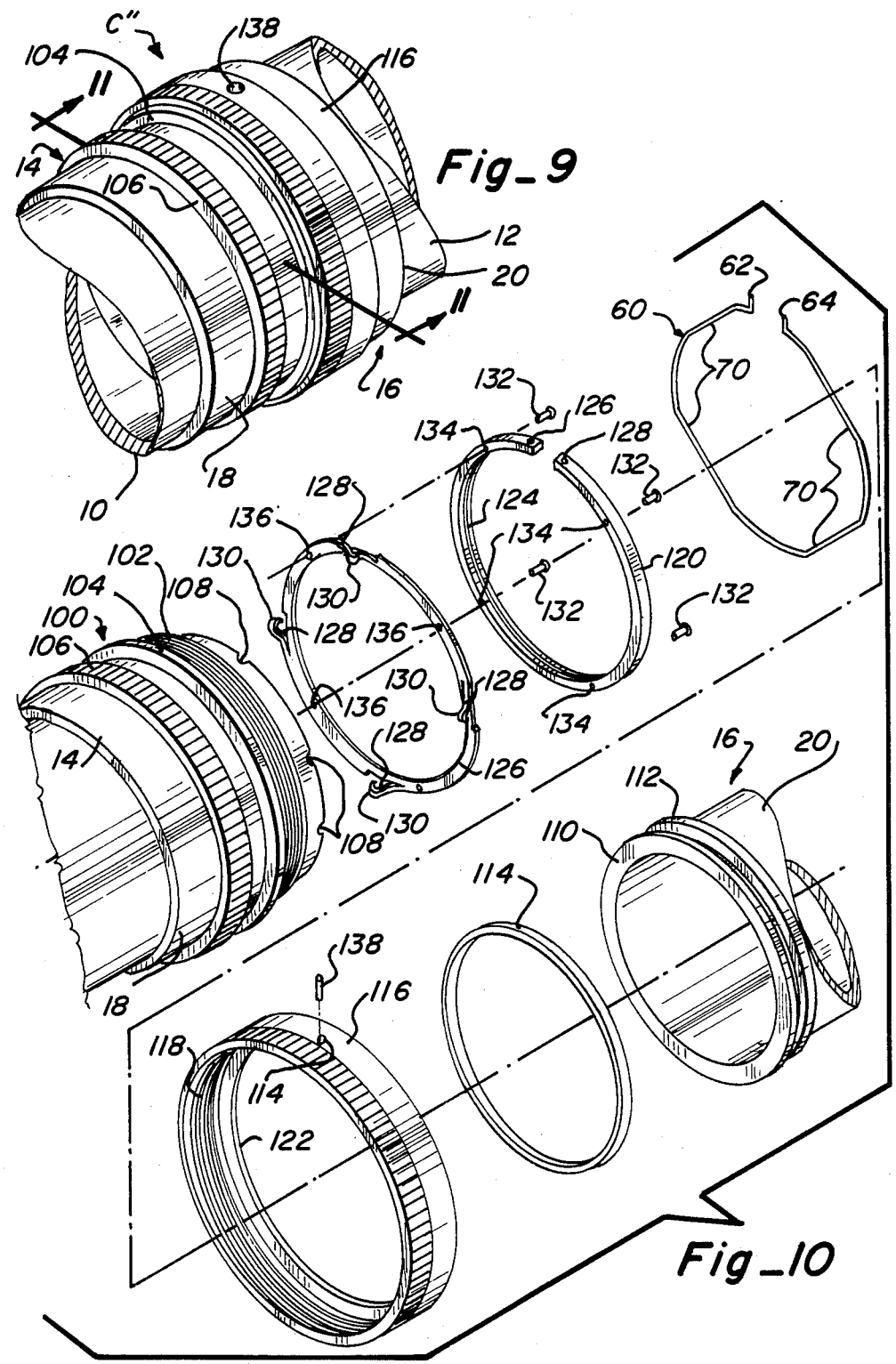

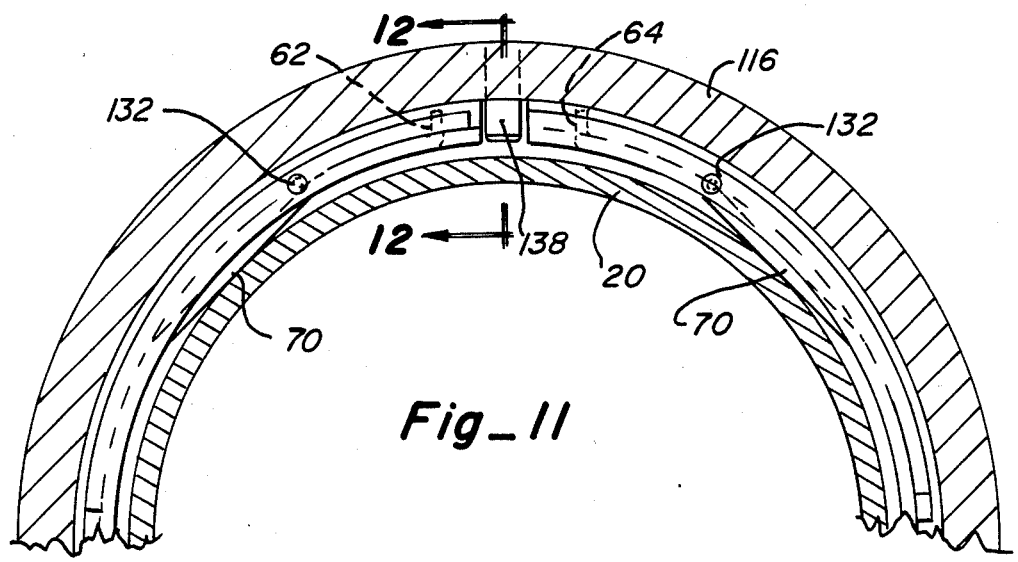
Fig_11
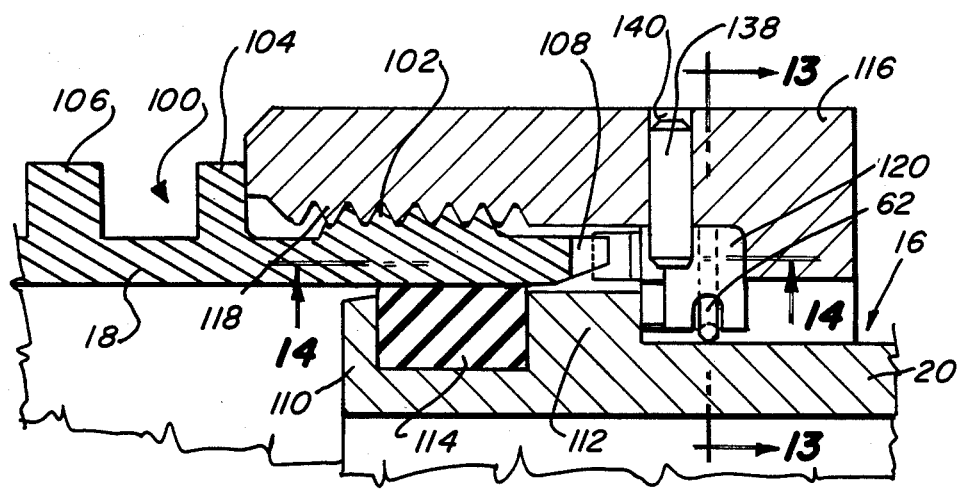
Fig_12
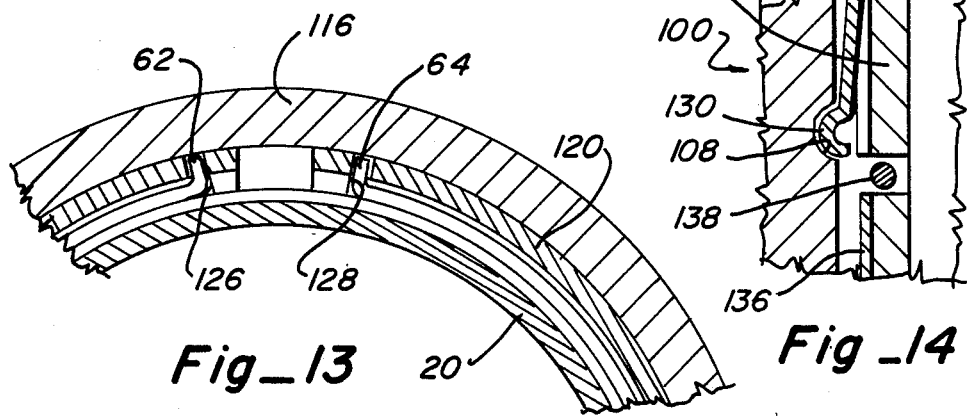
Fig_13  Fig_14

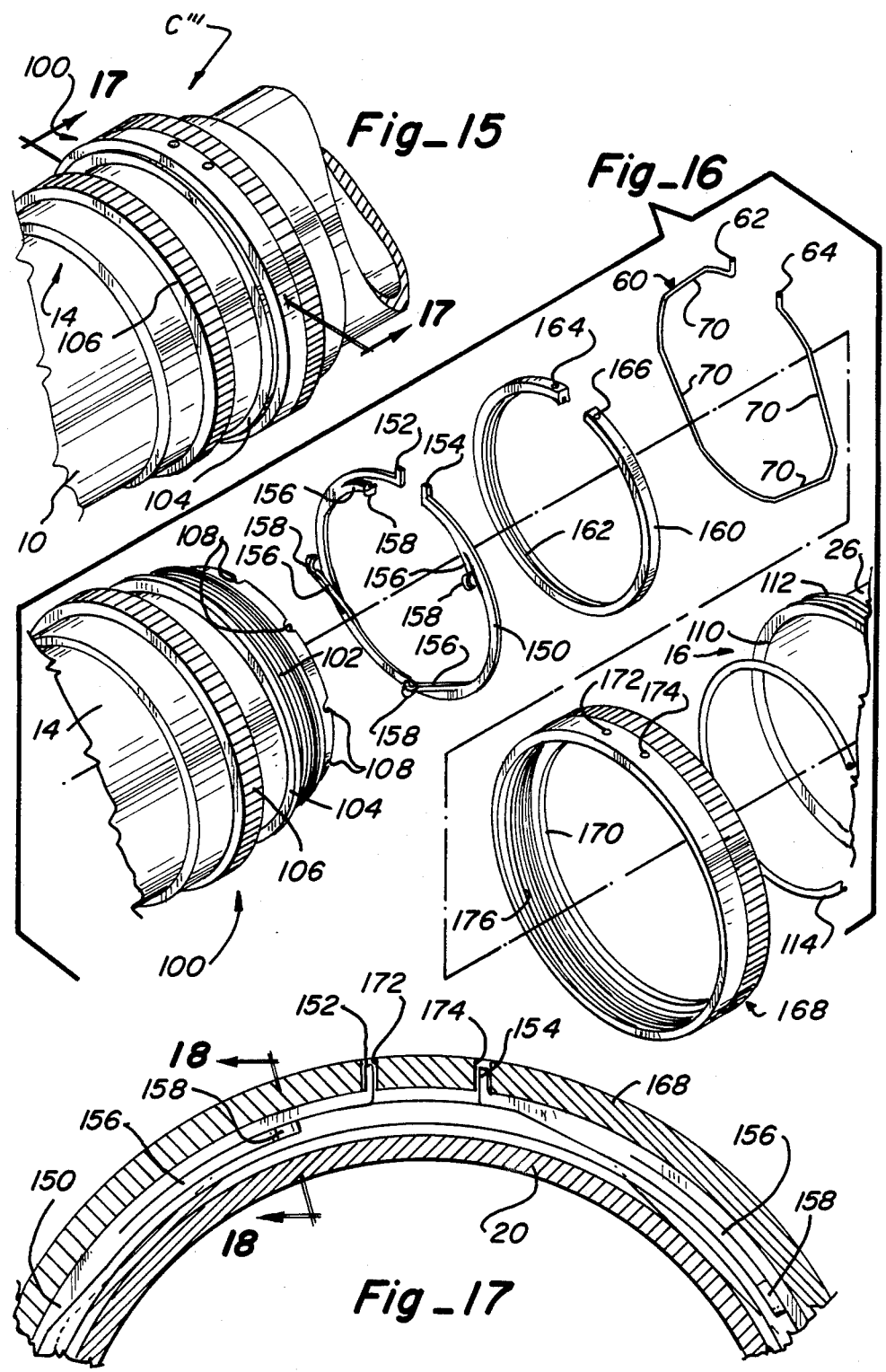

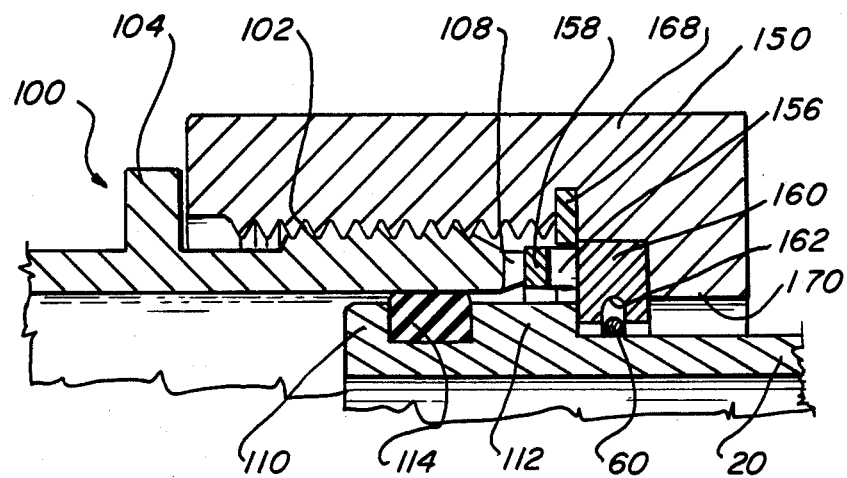
Fig_18

COUPLER WITH COMBINATION LOCKING AND BONDING RING

TECHNICAL FIELD

The present invention relates to a coupling assembly and, in particular, to a coupling assembly for interconnecting a pair of tubular conduit members in which the coupling assembly has a releasable locking member which also serves as a bonding jumper for minimizing electrical charge build up between the conduit members.

BACKGROUND ART

When conveying fluid, such as jet fuel, between interconnected conduits, it's highly advisable to provide electrical continuity between the interconnected conduits. Electrical continuity assures that there will be no build up of an electrostatic charge on a first conduit relative to the second interconnected adjacent conduit. As a result, a potential difference between the conduits or between a conduit and another reference surface is not created. It can be easily understood, that such a potential difference could give rise to an electrical spark and, in the presence of a vaporized fuel, the spark could cause the fuel to ignite.

Another requirement with aircraft fuel lines is that the seal provided by the coupling must be absolutely leakproof, and must be tightened in such a manner that it will not work loose in spite of vibrations or other internal or external forces to which it may be subjected.

A number of patents have proposed solutions to the problem of electrostatic charge build up. In U.S. Pat. No. 4,008,937 to Filippi, a coupling assembly is disclosed which is particularly adapted for use with fluid conveying lines. The coupling assembly includes an electrical jumper externally mounted thereon to minimize electrical charge build up and reduce the hazard of an electrical spark.

In U.S. Pat. No. 3,891,291 to Nadsady et al. a tubular coupling is disclosed which incorporates an electrical or bonding jumper. The bonding jumper includes an elongated leaf spring having undulations and made to fit wholly inside a retainer section. The leaf spring may include lateral projections which are wedged into locking engagement with side flanges within the retainer section. The leaf spring provides electrical contact between ferrules and fluid conveying tubular members.

In U.S. Pat. No. 3,999,825 to Cannon a tubular coupling assembly is disclosed which comprises a pair of retainer sections. Each of the retainer sections has a groove formed therein for containing a U-shaped conducting wire.

In U.S. Pat. No. 4,346,428 to Gale discloses a bonding jumper having a body portion and a pair of arms fixed to opposite ends of the body portion. The arms extend in opposite directions so that each arm contacts one of the annular flanges connected to each conduit member and a torque is produced tending to force the other arm into secure electrical contact with its contacted flange.

In U.S. Pat. No 4,487,462 to Gale et al. a pair of bonding jumpers are provided which each include an annular ring having a plurality of bonding jumper contact flanges at the inner edge which engages a surface of the flanges of the threaded coupling and a plurality of spaced retaining tangs at the outer edge which snap into a retaining groove in the coupler and the nut. The nut also includes a plurality of circumferentially spaced coupler contact tangs which are interspersed with the retaining tangs and contact the outer end of the coupler beyond the threads. While each of these devices work satisfactorily for its intended purpose of providing electrical bonding, none of them releasably lock the coupling to prevent uncoupling.

U.S. Pat. No. 3,669,472 to Nadsady discloses a coupling having an annular ring with spring fingers which releasably engage notches on the edge of a male connector to minimize the chance of the coupling becoming unthreaded due to vibrations or other forces on the coupling. In this device a separate releasable bonding ring is provided between the two coupling elements. A similar device is shown in British Pat. No. 1,046,601 to Marriette. French Pat. No. 692,067 to Bazinet discloses a washer having a spring finger which releasably engages a scalloped portion of a nut to releasably hold it in a fixed locked position. None of these patents disclose the use of the releasable locking means as a bonding jumper.

DISCLOSURE OF THE INVENTION

In accordance with the present invention, a threaded coupling assembly for interconnecting confronting ends of first and second fluid-carrying conduit members in locking and electrical bonding relationship is provided. The assembly comprises first and second coupling means threadably interconnected and circumferentially engaging the confronting ends of the conduit members to hold them in fluid communication. A complimentary peripheral facing surface is provided on each of the coupling means which are drawn axially toward each other as the coupling means are rotatably threaded together. A bonding jumper is mounted on one of the facing surfaces and has a plurality of resilient detent members for bearing against the other facing surface to establish a redundant electrical bond between the first and second coupling means when the facing surfaces are axially drawn toward each other. A plurality of recesses is provided in the other of the surfaces for coacting with the detent means to yieldably resist opposed relative rotation in the unthreading direction.

In the preferred embodiment, a peripheral flange is provided which has recesses equally spaced therearound for yieldably receiving the detent means exteriorly of the coupling. The bonding jumper is in the form of an annular ring having spaced spring fingers, the ring being held in place against angular rotation within an annular recess by a bent in segment of the peripheral edge of the annular recess which engages a notch in the peripheral edge of the ring. Also, a bonding wire of generally square configuration is provided which is split at one corner with outwardly extending ears at each end. The sides of the square are engagable with the conduit members to provide a redundant electrical contact. Apertures are provided adjacent to each end of a split ring for receiving each of the bonding wire ears. The split ring in turn is received in an annular groove in one of the coupling members.

In another embodiment the bonding jumper ring is attached to the split ring and the split ring is held in place within the annular recess. In one embodiment this means is a roll pin. In another embodiment the means includes ears extending upwardly from the bonding ring which is split and which extend into apertures in the flange of the coupling member.

With the present invention, it can be seen that a more efficient and economical coupling member is provided wherein the redundant electrical bonding and releasable locking means is provided in a single element which cooperates with the coupling means.

Additional advantages of this invention will become apparent from the description which follows, taken in conjunction with the accompanying drawings.

BRIEF DESCRIPTION OF THE DRAWINGS

FIG. 1 is a perspective view of a preferred embodiment of this invention;

FIG. 2 is an exploded, perspective view of the embodiment of FIG. 1 showing details of the various elements comprising the coupling;

FIG. 3 is an enlarged, fragmentary, horizontal section, taken along line 3—3 of FIG. 1, showing further details of the coupling means;

FIG. 4 is an enlarged, fragmentary vertical section, taken along line 4—4 of FIG. 3, showing details of the bonding member and locking means therefore;

FIG. 5 is an enlarged vertical section, taken along line 5—5 of FIG. 4, showing further details of the locking means;

FIG. 6 is a vertical section, taken along line 6—6 of FIG. 5, showing still further details of the locking means;

FIG. 7 is a fragmentary, horizontal section, similar to FIG. 3, but showing a reversal of the position of the elements of the bonding jumper;

FIG. 8 is an enlarged, fragmentary, horizontal section, taken along line 8—8 of FIG. 7, further showing the interlock of the spring finger of the bonding jumper to releasably lock the coupling in place;

FIG. 9 is a perspective view, similar to FIG. 1, but showing an alternative construction;

FIG. 10 is an exploded, perspective view of the embodiment of FIG. 9 showing details of the various elements comprising the coupling;

FIG. 11 is an enlarged, fragmentary, horizontal section, taken along line 11—11 of FIG. 9, showing details of the roll pin arrangement to hold the bonding jumper in position;

FIG. 12 is an enlarged, fragmentary, vertical section, taken along line 12—12 of FIG. 11, showing the interconnection between the bonding jumper and coupling mechanism;

FIG. 13 is a fragmentary, vertical section, taken along line 13—13 of FIG. 12, showing how the bonding wire locks into the split ring;

FIG. 14 is a fragmentary, horizontal section, taken along line 14—14 of FIG. 12, showing the interlock between the bonding jumper and the coupling member;

FIG. 15 is a perspective view, similar to FIGS. 1 and 9, but showing a still further alternative embodiment;

FIG. 16 is an exploded, perspective view of the embodiment of FIG. 15 showing details of the various elements comprising the coupling;

FIG. 17 is an enlarged, fragmentary, horizontal section, taken along line 17—17 of FIG. 15 showing details of the ear construction to hold the bonding jumper in position; and FIG. 18 is an enlarged, fragmentary, vertical section, taken along line 18—18 of FIG. 17, showing the interconnection between the bonding jumper and coupling mechanism.

BEST MODE FOR CARRYING OUT THE INVENTION

In accordance with this invention, a threaded coupling C, whose parts are made of electrically conducting material, is provided for interconnecting confronting-ends of fluid-carrying tubes or conduits 10 and 12. A pair of assembly sealing flanges 14 and 16, respectively, are advantageously connected to the ends of tubes 10 and 11, as best illustrated in FIGS. 1 and 3. The flanges each have a cylindrical skirt 18 and 20, respectively, which is attached to the respective tubes 10 and 12 by any suitable means, such as swaging, brazing or welding. Conveniently, each flange is provided with a peripheral recess, such as recesses 22 and 24, respectively, for receiving O-rings 26 and 28, respectively. As can be seen, recess 22 is formed between a pair of peripheral ribs 30 and 32 and recess 24 is formed between a pair of similar ribs 34 and 36. The confronting ends of conduits are interconnected by means of a threaded coupler 38 and a nut 40 which draw them toward each other axially to secure them together and form a fluid-tight seal, as will be described. The sleeve coupler 38 is generally cylindrical in shape and is slidable over sealing flange 14 and has an inwardly projecting flange 42 on its outer end and external threads 44 on its inner end. The inner and outer ends are separated by a peripheral external annular flange 46 whose purpose will be described below. Within coupler 30 and adjacent to inner side of 42 is a circumferential retaining groove 48 receiving a retainer ring 50, to be described.

The nut or female member 40 has inwardly projecting peripheral flange 52 on it end and internal threads 54 which are receive threads 44 of coupler 38. The flange 52 serves stop for retaining ring 56.

As best seen in FIG. 2, retain ring 50 is split and has an internal groove 58 within bonding ring 60 is received. Conveniently, the ring has a generally square configuration and i at one corner having upturned spaced ears 62 64. These ears can be squeezed together in order insert bonding ring 60 into groove 58 of split ring The ends of ears 62 then project upwardly through 66 and 68 located adjacent the ends in split 50. This split ring 50 serves to retain the 38 on sealing flange 14. The flat sides o . ring 70 engage the peripheral surface of sea 14 to provide multiple electrical contact providing the required redundancy for use in aircraft. Flange 48 has a plurality of spaced notches 72 which are utilized with a bonding jumper 74, to be described.

Split ring 56 fits within nut 40 against the face of flange 52. Within this spit 56 a bonding ring 76 is provided. This bonding r identical in construction to bonding ring 60, having a generally square configuration with flat surfaces 78 and having upturned ears 80 and 82 at one corner are received in apertures 84 and 86, respectively, adjacent the ends of split ring 56. Conveniently, split ring 56 has an internal groove 88 within which bonding ring 76 is received and is positioned inwardly of flange 36 on sealing flange 16 for providing an innerlock between nut 40 and the sealing flange. At its outer end, nut 50 is provided with a larger recess 90, formed with peripheral edge 91, within which bonding jumper 74 is received. The bonding jumper has a plurality of equally spaced spring detents 92, each of which has a curved end 94. The bonding jumper is also provided with spaced notches 96 into which the edge 91 is bent to form a crimp 98 to prevent relative rotation of bonding jumper 74 with respect to nut 40. It will be understood that as nut 40 is tightened, the curved ends of spring detents 92 will come into engagement with flange 46 of coupler 38 and will engage the notch as 72. As the nut is drawn tight, the force of each spring detent against flange 46 and notches 72 will increase. This arrangement provides a redundant electrical contact between nut 40 and coupling 38. Advantageously, the bonding jumper 74 also serves to minimize the possibility that the nut will turn in a reverse direction accidentally due to vibrations or other forces. Obviously, if the coupling C is to be disassembled one can turn the nut in a counterclockwise direction overcoming the force of the spring detents so that the parts can be separated. Also, the two bonding jumper rings 60 and 76 assure that there is good and redundant electrical contact between the coupler and sealing flange 14 and the nut and sealing flange 16, respectively. Thus, good electrical continuity between conduits 10 and 12 will be assured.

If desired, ears 62 and 64 can be omitted from bonding ring 60 and ears 80 and 82 can be omitted from bonding ring 76. In this event the bonding rings are staked to retaining rings 50 and 56, respectively and apertures 66 and 68 and apertures 84 and 86, respectively, are also omitted.

Alternatively, the bonding jumper 74 can be provided on the coupling member and the notched flange provided on the nut, as shown in FIGS. 7 and 8. In this regard, coupling C' includes a coupler 38' which has an annular flange 90' with a lip 91' for receiving bonding jumper 74. The lip 91' has bent down portions 98' which engage notches 96 of bonding jumper 74. Nut 40' includes a peripheral external flange 46' having notches 72' for receiving the curved ends 94 of spring detents 92. This arrangement is best seen in FIGS. 7 and 8.

An alternative embodiment is shown in FIGS. 9-14 wherein the bonding jumper ring is mounted within the nut and the notches which the spring detents engage are on the peripheral edge of the threaded sleeve coupler as will be described. A threaded coupler 100 is formed intergrally with skirt 18 which includes a distal end portion having threads 102. Inwardly of the threads is an annular stop 104 in the form of a rib. Spaced further inwardly is a knurled rib 106 which can be gripped for tightening the coupling connection C''. At the distal end of threaded coupler 100 are a plurality of peripherally spaced notches 108.

Sealing flange 16 has a pair of spaced ribs 110 and 112 at its distal end for receiving O-ring 114 which comes into engagement with the inside surface of skirt 18, as best seen in FIG. 12 to provide a fluid tight seal. A nut 116 has internal threads 118 which are engagable with threads 102 of threaded coupler 100. A retaining ring 120 is receivable within nut 116 and is seated against an inwardly extending peripheral flange 122. Conveniently, a bonding ring 60 is receivable in a peripheral groove 124. The bonding ring 60 can be squeezed together at ear 62 and 64 for insertion into groove 124 of retaining ring 120 with the ears extending through apertures 126 and 128 respectively.

A bonding jumper 126 includes a plurality of spaced spring detents 128 on the outer periphery thereof each of which terminates in a curved end 130, engagable with notches 108 of threaded coupler 100. Conveniently, bonding jumper 126 can be attached to the outer surface of retaining ring 120, as by rivets 132 which extend through apertures 134 in retaining ring 120 and apertures 136 in bonding jumper 126. Retaining ring 120 and those elements connected to it, such as bonding ring 60 and bonding jumper 126 are held in fixed position within nut 116 by means of roll pin 138 which extends through an aperture 140 in nut 116 and down between the spaced ends of split ring 120, as best seen in FIGS. 11 and 12.

A further alternative embodiment is shown in FIGS. 15-18. This embodiment has similar parts to the embodiments of FIGS. 9-14 with the exception of the bonding jumper, split retaining ring and nut, as described below. In this regard, bonding jumper 150 is in the form of a split ring having upstanding ears 152 and 154. The bonding jumper also includes spaced spring detents 156 on the inner periphery thereof, with curved ends 158 which engage notches 108 of threaded coupler 100, as in the previous embodiment.

A split retaining ring 160 has a peripheral internal groove 162 into which bonding ring 60 can be inserted by squeezing upstanding ears 62 and 64 together. These upstanding ears are received in apertures 164 and 166 of retaining ring 160 to hold the bonding ring 60 in relative position. The retaining ring and bonding ring are received within nut 168, retaining ring 160 fitting flush against inwardly extending peripheral flange 170. Nut 168 also has a pair of spaced apertures 172 and 174. These apertures receive upstanding ears 152 and 154, respectively, of bonding jumper 150 when the ears are squeezed together so that the bonding jumper can be inserted into the nut. Nut 168 has internal threads 176 which are received over threads 102 to draw all of the elements into sealing engagement and to bring curved ends 158 of spring detents 156 into engagement with notched 108 as best seen in FIG. 18, to provide redundant electrical contact.

From the foregoing, the advantages of this invention are readily apparent. The various embodiments provide a redundant electrical bonding jumper which also serves as a spring detent to resist uncoupling of the coupling member due to vibrations or other ambient forces. Also, a bonding ring provides redundant bonding between the conduit and the coupling so that positive and redundant contact is assures throughout the coupling so that the possibility of electrical charges building up between the two connected conduits is minimized.

The invention has been described in detail with particular reference to preferred embodiments thereof, but it will be understood that variations and modifications can be effected within the spirit and scope of the invention.

We claim:

1. A threaded coupling assembly for interconnecting confronting ends of first and second fluid-carrying conduit members in locking and electrical bonding relationship, said assembly comprising:

first and second coupling means threadably interconnected and circumferentially engaging the confronting ends of said conduit members to hold them in fluid communication;

a complementary peripheral facing surface on each of said coupling means which are drawn axially toward each other as said coupling means are rotatably threaded together;

a bonding jumper in the form of a ring mounted on one of said facing surfaces having a plurality of resilient spring fingers for bearing against said other facing surface to establish a redundant electrical bond between said first and second coupling means when said facing surfaces are axially drawn toward each other;

a plurality of recesses in said other surface for coacting with said spring fingers to yieldably resist opposed relative rotation in the unthreading direction;

an annular recess in said one of said facing surfaces for receiving said ring, said recess having a peripheral edge;

a notch in a peripheral edge of said ring; and a bent-in segment of said peripheral edge in engagement with said notch to prevent relative rotation.

2. The assembly, as claimed in claim 1, said other surface includes:

a peripheral flange having recesses equally spaced therearound for yieldably receiving said spring fingers.

3. A threaded coupling assembly for interconnecting confronting ends of first and second fluid-carrying conduit members in locking and electrical bonding relationship, said assembly comprising:

first and second coupling means threadably interconnected and circumferentially engaging the confronting ends of said conduit members to hold them in fluid communication;

a complementary peripheral facing surface on each of said coupling means which are drawn axially toward each other as said coupling means are rotatably threaded together;

a bonding jumper in the form of a ring mounted on one of said facing surfaces having a plurality of resilient spring fingers for bearing against said other facing surface to establish a redundant electrical bond between said first and second coupling means when said facing surfaces are axially drawn toward each other;

a plurality of recesses in said other surface for coacting with said spring fingers to yieldably resist opposed relative rotation in the unthreading direction;

at least one of said coupling means includes an internal peripheral groove;

a split ring releasably mounted in said groove;

means securing said split ring in said groove in fixed position; and a bonding wire fixedly positioned within said split ring for contacting one of said conduit members.

4. An assembly, as claimed in claim 3, wherein said securing means includes:

a roll pin extending through said one of said coupling means.

5. An assembly, as claimed in claim 3, wherein:
said bonding jumper is mounted in fixed position in contiguous relationship with said split ring.

6. An assembly, as claimed in claim 5, wherein:
said bonding jumper is attached to said split ring.

7. An assembly, as claimed in claim 5, wherein:
said bonding jumper is attached to said split ring with rivets.

8. An assembly, as claimed in claim 5, wherein:
said bonding wire is generally square in configuration and is split at one corner with outwardly extending ears at each end, the sides of said square being engagable with said one of said conduit members to provide redundant electrical contact; and apertures adjacent each end of said split ring for receiving each of said bonding wire ears, respectively.

9. An assembly, as claimed in claim 5, wherein:
said bonding wire is generally square in configuration; and said split ring is staked against said bonding wire to hold it in place.

10. A threaded coupling assembly for interconnecting confronting ends of first and second fluid-carrying conduit members in locking and electrical bonding relationship, and assembly comprising:

first and second coupling means threadably interconnected and circumferentially engaging the confronting ends of said conduit members to hold them in fluid communication;

a complementary peripheral facing surface on each of said coupling means which are drawn axially toward each other as said coupling means are rotatably threaded together;

a bonding jumper in the form of a split ring with spaced ears mounted on one of said facing surfaces having a plurality of resilient spring fingers for bearing against said other facing surface to establish a redundant electrical bond between said first and second coupling means when said facing surfaces are axially drawn toward each other;

a plurality of recesses in said other surface for coacting with said spring fingers to yieldably resist opposed relative rotation in the unthreading direction;

at least one of said coupling means includes an internal peripheral groove;

a split ring releasably mounted in said groove;

means securing said split ring in said groove in fixed position;

a bonding wire fixedly positioned within said split ring for contacting one of said conduit members; and spaced apertures are provided in one of said coupling means for receiving said ears to lock said bonding jumper in fixed position.

* * * * *